United States Patent
Xu et al.

(10) Patent No.: US 10,747,759 B2
(45) Date of Patent: Aug. 18, 2020

(54) SYSTEM AND METHOD FOR CONDUCTING A TEXTUAL DATA SEARCH

(71) Applicant: City University of Hong Kong, Kowloon (HK)

(72) Inventors: Ruiyun Xu, Kowloon Tong (HK); Hailiang Chen, Kowloon (HK); J. Leon Zhao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 23 days.

(21) Appl. No.: 15/631,077

(22) Filed: Jun. 23, 2017

(65) Prior Publication Data

US 2018/0373754 A1 Dec. 27, 2018

(51) Int. Cl.
| | |
|---|---|
| *G06F 16/30* | (2019.01) |
| *G06F 16/245* | (2019.01) |
| *G06F 16/242* | (2019.01) |
| *G06F 16/332* | (2019.01) |
| *G06F 16/33* | (2019.01) |

(52) U.S. Cl.
CPC .......... *G06F 16/245* (2019.01); *G06F 16/242* (2019.01); *G06F 16/332* (2019.01); *G06F 16/334* (2019.01); *G06F 16/3331* (2019.01)

(58) Field of Classification Search
CPC .... G06F 16/248; G06F 16/245; G06F 16/242; G06F 16/334; G06F 16/3331
USPC ....... 707/607, 609, 687, 705, 769, 790, 813, 707/821
See application file for complete search history.

(56) References Cited

U.S. PATENT DOCUMENTS

| | | | |
|---|---|---|---|
| 5,832,476 A | 11/1998 | Tada et al. | |
| 9,218,344 B2 | 12/2015 | Al-Kofahi et al. | |
| 2013/0297590 A1* | 11/2013 | Zukovsky | G06F 16/248 707/722 |
| 2014/0289675 A1* | 9/2014 | Stading | G06Q 10/10 715/810 |

FOREIGN PATENT DOCUMENTS

| | | |
|---|---|---|
| CN | 105589948 A | 5/2016 |
| CN | 105787068 A | 7/2016 |

OTHER PUBLICATIONS

D. M. Blei, A. Y. Ng, and M. I. Jordan. 2003. Latent Dirichlet Allocation. Journal of Machine Learning Research (JMLR), 993-1022.

S. Bethard, and D. Jurafsky. 2010. Who Should I Cite: Learning Literature Search Models from Citation Behavior. In Proceedings of the 19th ACM International Conference on Information and Knowledge Management (CIKM).

(Continued)

*Primary Examiner* — Sana A Al-Hashemi
(74) *Attorney, Agent, or Firm* — Renner Kenner Greive Bobak Taylor & Weber (57) ABSTRACT

A system and a method for conducting a textual data search includes receiving a search query associated with a search topic; analyzing the search query to determine at least one attribute of the search topic; processing the at least one attribute and a plurality of articles in a database; and identifying one or more results being relevant to the search topic in the plurality of articles in the database.

20 Claims, 4 Drawing Sheets

(56) References Cited

OTHER PUBLICATIONS

T. Strohman, W. Bruce Croft, and D. Jensen. 2007. Recommending Citations for Academic Papers. In Proceedings of the 30th Annual International ACM Conference on Research and Development in Information Retrieval (SIGIR).

Y. Yue, T. Finley, and F. Radlinski. 2007. A Support Vector Method for Optimizing Average Precision. In Proceedings of the 30th Annual International ACM Conference on Research and Development in Information Retrieval (SIGIR).

* cited by examiner

SYSTEM AND METHOD FOR CONDUCTING A TEXTUAL DATA SEARCH

TECHNICAL FIELD

The present invention relates to a system and method for conducting a textual data search, and particularly, although not exclusively, to a system and method for conducting a literature search and identifying citation data.

BACKGROUND

Textual contents may be digitally contained in a document stored in an electronic database. In general, when a user needs to retrieve the textual data in a document stored in a large database, the user will need to locate the specific document from multiple documents within the one or more databases.

Locating or searching specific documents or articles may involve matching a search query with the information stored within the documents. However, it may be difficult to locate some of the stored documents if the search query is not accurately formulated in some occasions, which may cause the searching process to become time consuming and inefficient.

SUMMARY OF THE INVENTION

Embodiments of the present invention improve the accuracy of citation recommendation systems and potentially other document retrieval systems by adding a "wisdom of crowds" feature based on citation network and content similarity. To evaluate whether the query document should cite a specific document or not, it is reasonable to gather the crowds' opinions on this matter, i.e., whether each of the remaining documents in the corpus cites it or not.

The opinions or citing decisions of documents that are more similar to the query document should be given more weight because semantically (or topically) similar documents are more likely to share the same set of references/citations. The usefulness and value of this "wisdom of crowds" feature is attributed to the fact that researchers or scholars put a lot of thought into their decisions of identifying the most relevant references and citations for their work.

Various embodiments of the present invention concern information-retrieval systems, which may be used to provide recommendations based on topic modelling of textual data. The present invention further relates generally to information science and more particularly to the fields of bibliometrics and scientometrics.

In accordance with a first aspect of the present invention, there is provided a method of conducting a textual data search, comprising the steps of: receiving a search query associated with a search topic; analyzing the search query to determine at least one attribute of the search topic; processing the at least one attribute and a plurality of articles in a database; and identifying one or more results being relevant to the search topic in the plurality of articles in the database.

In an embodiment of the first aspect, the at least one attribute includes a topical similarity between the search query and each of the plurality of articles in the database.

In an embodiment of the first aspect, the method further comprises the step of constructing the topical similarity based on text information of both the search query and each of the plurality of articles in the database.

In an embodiment of the first aspect, the step of processing the at least one attribute and the plurality of articles in the database further includes inferring at least one relevant topic and a plurality of topic distribution associated with the search query and the plurality of articles in the database over the at least one relevant topic.

In an embodiment of the first aspect, the processing of the at least one attribute and the plurality of articles in the database is based on Latent Dirichlet Allocation (LDA).

In an embodiment of the first aspect, the topical similarity between the search query and each of the plurality of articles in the database is represented as a cosine similarity of the plurality of topic distribution.

In an embodiment of the first aspect, the cosine similarity is represented as:

$$\text{topical\_similarity}_{qd} = \text{Cosine}(Q, D) = \frac{Q \cdot D}{|Q||D|};$$

wherein Q denotes a multinomial distribution of the search query q over the at least one relevant topic and D denotes a multinomial distribution of an article d in the database over the at least one relevant topic.

In an embodiment of the first aspect, the at least one attribute includes an aggregate likelihood that assesses whether each of the plurality of articles is to be cited by other articles with a similar topic in the database.

In an embodiment of the first aspect, the at least one attribute further includes crowd-based information associated with a list of references in each of the articles in the database.

In an embodiment of the first aspect, the aggregate likelihood is associated with the topical similarity between each of the plurality of articles and the other articles in the database.

In an embodiment of the first aspect, the aggregate likelihood is represented as:

$$\text{aggregate\_likelihood\_being\_cited}_{qd} = \Sigma_i^{n-1} \text{topical\_similarity}_{qi} \cdot c_{id};$$

wherein i denotes an article in the database except for the article d in the database, $c_{id}$ denotes a binary variable which represents a citation relationship of the article i to the article d, and $\text{topical\_similarity}_{qi}$ denotes the topical similarity between the search query and the article i.

In an embodiment of the first aspect, the aggregate likelihood may be normalized by the citation count of the article and represented as:

$$\text{aggregate\_likelihood\_normalized}_{qd} = \Sigma_i^{n-1} \text{topical\_similarity}_{qi} \cdot c_{id} / \Sigma_i^{n-1} c_{id}.$$

In an embodiment of the first aspect, the method further comprises the step of representing $c_{id}$ with a citation matrix containing a plurality binary variables each represent a citation relationship of the article i to the article d.

In an embodiment of the first aspect, the method further comprises the step of determining a score for each of the plurality of articles in the database, wherein the score is related to a linear representation of the at least one attribute of the search topic.

In an embodiment of the first aspect, the linear representation includes a weighted sum of the at least one attribute.

In an embodiment of the first aspect, the weighted sum of the at least one attribute is represented as: $\text{score}(q,d) = \Sigma_i w_i \times f_i(q,d)$; wherein q denotes the search query, d denotes an article in the database, and $w_i$ denotes a feature weight assigned for each of the at least one attribute $f_i(q,d)$.

In an embodiment of the first aspect, the feature weight is determined based on a linear classifier.

In an embodiment of the first aspect, the linear classifier includes at least one of a logistic regression method and a Support Vector machine for optimizing Mean Average Precision method.

In an embodiment of the first aspect, the method further comprises the step of obtaining the one or more result representing the one or more of the plurality of articles in the database in an order according to the determined score.

In accordance with a second aspect of the present invention, there is provided a system for use in conducting a textual data search, comprising: a search input module arranged to receive a search query associated with a search topic and to analyze the search query to determine at least one attribute of the search topic; and a database processing module arranged to process the at least one attribute and a plurality of articles in a database, and to identify one or more results being relevant to the search topic in the plurality of articles in the database.

In an embodiment of the second aspect, the at least one attribute includes a topical similarity between the search query and each of the plurality of articles in the database.

In an embodiment of the second aspect, the search input module is further arranged to construct the topical similarity based on text information of both the search query and each of the plurality of articles in the database.

In an embodiment of the second aspect, the at least one attribute includes an aggregate likelihood in which each of the plurality of articles is to be cited by other articles with a similar topic in the database.

In an embodiment of the second aspect, the at least one attribute further includes crowd-based information associated with a list of references in each of the articles in the database.

In an embodiment of the second aspect, the aggregate likelihood is associated with the topical similarity between each of the plurality of articles and the other articles in the database.

In an embodiment of the second aspect, the database processing module is further arranged to determine a score for each of the plurality of articles in the database, wherein the score is related to a linear representation of the at least one attribute of the search topic.

In an embodiment of the second aspect, the one or more result represents one or more of the plurality of articles in the database in an order according to the determined score.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that literature search is a tedious and time-consuming work for researchers, and it is often difficult to find a complete list of relevant articles.

One of the difficulties in literature search is the composition of an appropriate query for a literature search engine. For example, text-based search engines often give poor results when there is a vocabulary mismatch between the query and relevant documents. To address this problem, in one example embodiment, a different method may be used, in which the search engine takes a research project description such as an abstract as the query input and recommends a list of possible citations as the output.

Preferably, compared with the keyword-based query, the abstract-based query not only contains richer information, but also relieves users from the burden of identifying the most appropriate query words. Advantageously, the longer query does not necessarily have to be a well-written abstract. Any related keywords can be simply added to the query input, since the citation recommendation method is based on the bag-of-words assumption, that is, the sequence of words in a sentence is neglected.

Without wishing to be bound by theory, authors' citation choices may be influenced by various factors. The search method may involve a number of features such as content similarity, author characteristics, article venue characteristics, and authors' citation behavior. To implement these features, much information needs to be collected from different sources. The cost of such data collection efforts can be substantial in practice and thus may prevent the wide adoption of some features.

In one preferred embodiment, there is provided a lightweight citation recommendation method based on readily available information including article abstracts and citation networks (which may be constructed from articles' reference lists). By drawing from the topic modeling literature, a new feature such as aggregate likelihood of being cited by similar articles to exploit the "wisdom of crowds" may be embedded in the citation networks of academic articles.

In some examples, many of the identified features are more or less related with article citation networks. For instance, the citation count of an article is its in-degree in the citation network. For example, if a journal has a high impact factor, the articles published in that journal may be cited by many other articles. Self-citation essentially involves a paper citing another paper, which has one or more authors in common. Articles on related topics may cite the same list of seminal works, which may imply that a new article on these topics should also cite the seminal works as inferred from the citation network.

Instead of adding many features that are intended to capture different things, the inventors devised that one simple "wisdom of crowds" measure may potentially achieve the same purpose but at a much lower cost. Preferably, the method in accordance with the embodiments of the present invention only involves two features, however the method may achieve a similar level of accuracy according to experiments on a standard dataset (i.e., ACL Anthology Reference Corpus) compared with other example methods which may use many additional features.

Figure 1:
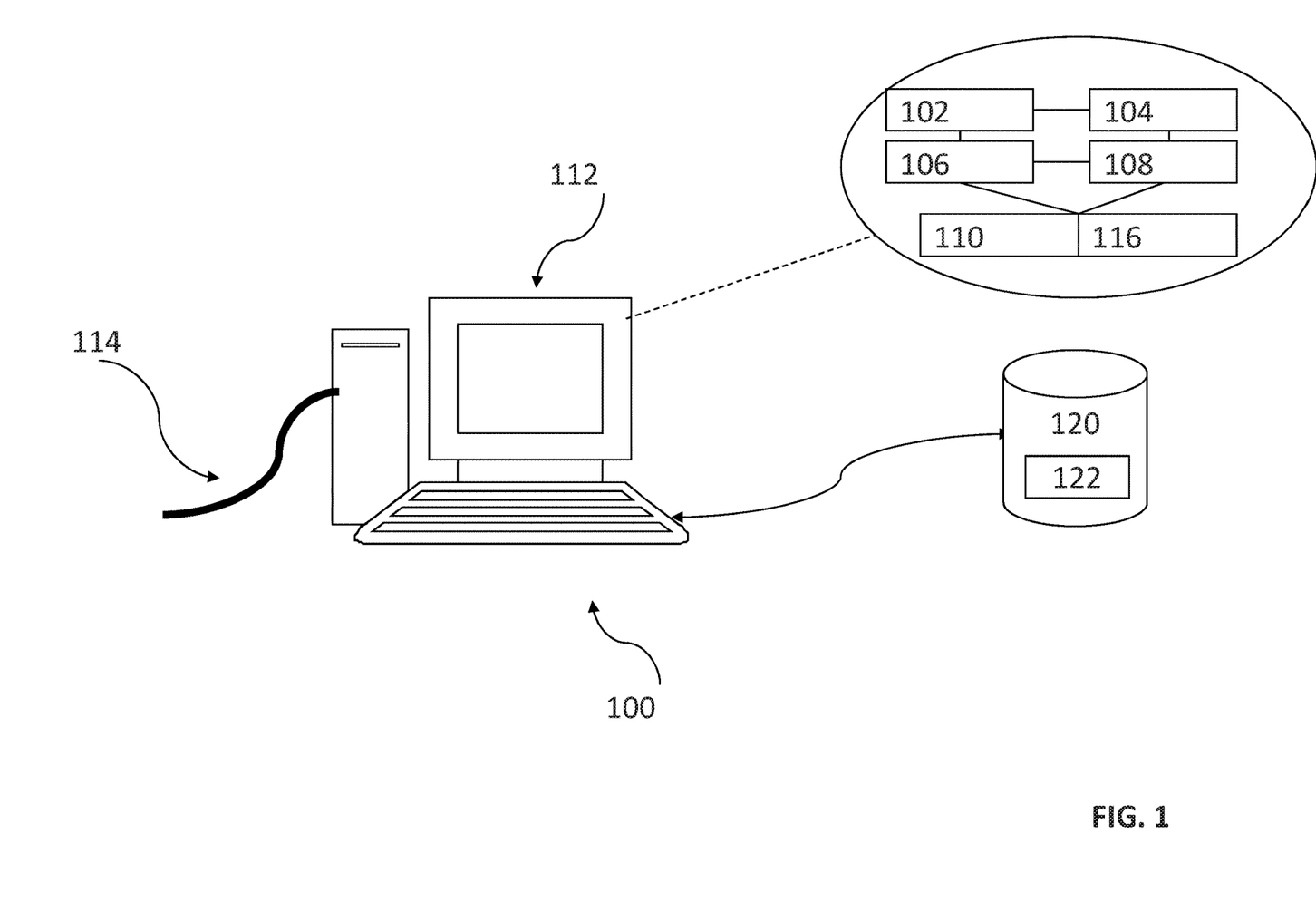
FIG. 1 is a schematic diagram of a computing server for operation as a system for use in conducting a textual data search in accordance with one embodiment of the present invention.

With reference to FIG. 1, an embodiment of the present invention is illustrated. This embodiment is arranged to provide a system for use in conducting a textual data search, comprising: a search input module arranged to receive a search query associated with a search topic and to analyze the search query to determine at least one attribute of the search topic; and a database processing module arranged to process the at least one attribute and a plurality of articles in a database, and to identify one or more results being relevant to the search topic in the plurality of articles in the database.

Preferably, in one example, the system may be used as an information retrieval system which may output one or more results of a textual content relevant to a search topic. By using the search method in accordance with the embodiments of the present invention, the results may be provided as a list of articles in an order based on the attributes/features of the search query and the articles in the database and the scores of each of the identified articles in the list.

In this embodiment, the search input module and the database processing module are implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is shown a schematic diagram of a computer or a computing server 100 which in this embodiment comprises a server 100 arranged to operate, at least in part if not entirely, the system for use in conducting a textual data search in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device, which is arranged to store at least one record 122. The database 120 is in communication with the server 100 with an interface, which is implemented by computer software residing on the server 100.

Alternatively, the database 120 may also be implemented as a stand-alone database system in communication with the server 100 via an external computing network, or other types of communication links.

In one preferred embodiment, the server 100 may be used as a citation recommendation system for identifying relevant citations for a research study.

For example, a topic models-based method may be used to predict the presence of a citation link between every pair of documents based on the text content of the documents. It may utilize the citation context (i.e., the words around citation placeholders, or citing snippets) in addition to the text content to recommend a list of reference papers given the input of a manuscript.

In an alternative example, a citation recommendation framework may use both content and citation graph-based information. Various measures are constructed from the citation graph including co-citation coupling, same author, Katz, and citation count. Katz, which refers to the number of unique paths between two articles exponentially damped by length, represents the connection closeness between two documents. The recency of publication is also included in the feature set. Then, the features are combined in a linear model to produce a document score, which may be used to rank the documents.

In addition, a feature set may be enriched with topical similarity and author behavioral patterns including scientific article popularity, recency, citing snippets, topic-related citing pattern, and social habits. In these examples, two different linear classifiers, namely logistic regression model and SVM-MAP, may be utilized to learn the weights of all the features in the retrieval model. Besides, an iterative paradigm may be applied for learning model weights. The method is found to be outperforming the single-iteration training.

Preferably, the method may incorporate one or more attributes or features when constructing the relevance score. These attributes relate to information such as article metadata, author metadata, publication venue (e.g., journal, conference, workshop) metadata, and authors' citing behavioural patterns or habits. For instance, citation count, year of publication, co-citation, and self-citation can be incorporated in the calculation of the relevance score.

To calculate a relevance score based on multiple features, a linear or nonlinear model may be adopted. For example, a simple linear model may score each document against the query as a weighted sum of various feature scores. The feature weights can be obtained by fitting a logistic regression or the Support Vector machine for optimizing Mean Average Precision (SVM-MAP) model.

A relevance score system may be applied to score or to sort the documents in a large corpus or database of documents with respect to a query (e.g., short description, abstract, full article, search terms) and then rank documents to identify candidates to be recommended as potential citations.

For example, the relevance score system may involve the ranking of relevance scores based on content similarity. Content similarity may be calculated based on a TF-IDF (Term Frequency-Inverse Document Frequency) score.

The scoring system may be alternatively based on topic modeling, which may determine the content similarity score, specifically, topical similarity, etc. between the query and a document in the corpus using a vector space model along with cosine similarity. Further discussions will be included in the later parts of the disclosure.

Based on the abovementioned features, the inventors devise that aggregate likelihood of being cited by similar articles which captures the wisdom of crowds in the reference lists of academic articles may be used. In addition, the topical similarity feature which measures content similarity based on topic models may also be used in some example embodiments.

In accordance with one aspect the present invention, the improved system and method provided in accordance with the following embodiments outperform existing citation recommendation systems and methods which may require many features in order to guarantee the accuracy of the recommendation systems. In practice, many of these features may be related to the citation network formed by documents in the large corpus. For example, the citation count of a document may be its in-degree in the citation network.

Without wishing to be bound by theory, if a journal has a high impact factor, the documents published in that journal may be on average cited by many other documents. Self-citation essentially involves a document citing another document, which has one or more authors in common. Documents on related topics typically cite the same list of seminal works, which implies that a new document on these topics should also cite the seminal works as inferred from the citation network.

Figure 2:
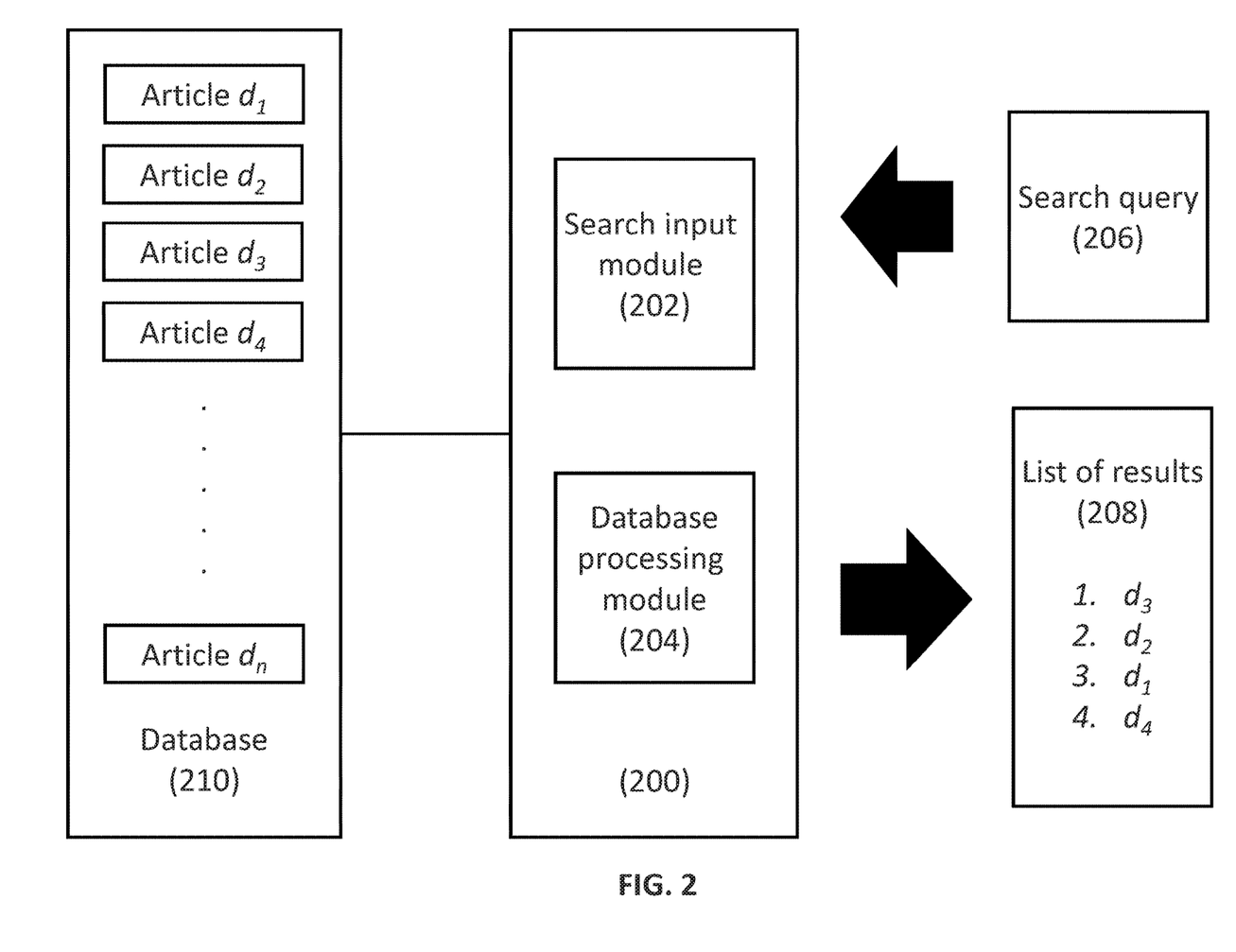
FIG. 2 is a schematic diagram of an embodiment of the system for use in conducting a textual data search in accordance with one embodiment of the present invention.

With reference to FIG. 2, there is shown an embodiment of the system 200 for use in conducting a textual data search. In this embodiment, the server 100 is used as part of a search engine 200 arranged to conduct a search of the articles stored in the database 210. In this embodiment, the search engine 200 may communicate with a database 210 which may be external to the search engine 200 including the search input module 202 and the database processing module 204.

Preferably, the system 200 is arranged to receive a search query 206 and return one or more articles in a database which is relevant to the topic(s) as a list of results 208. In an example searching process, the search input module 202 may receive and process the search query 206 to derive the necessary features or attributes relevant to a search topic. These attributes may be passed to the database processing module 204 for further processing. For example, the database processing module 204 may access one or more databases 210 according to the search requirement and process the attributes to identify the relevance of each of the articles in the database 210 to the search topic or search query 206.

Alternatively, the database 210 may be locally included in the same system 200 for use in conducting a textual data search, or search engine 200 including the search input module 202 and the database processing module 204 may be selectively implemented in a database 210 for facilitating a search of the articles stored in the database 210.

As discussed above, the search query 206 may be in a form of a brief description or an abstract of the topic and may not necessarily be in form a keyword limited search with Boolean operators as appreciated by a skilled person in the art.

For example, a user may input a search query 206 including a search topic to the search system 200, the search input module 202 may then analyse the search query 206 and identify one or more features/attributes of the input search topic. As discussed earlier, these attributes may include at least a topical similarity between the search query and each of the plurality of articles in the database, as well as an aggregate likelihood in which the search articles may be cited by other articles with a similar topic in the database.

In one example search process, the search input module 202 first identifies two features of great importance to authors' citation choices. Then the database processing module 204 may process the identified attributes and the articles in the database 210. The database processing module 204 may further score each document $d_i$ against the query (i.e., an abstract) q as a weighted sum of features scores. Preferably, scores may be assigned to each of the articles in the database 210 for a single search query q as follows:

$$\text{score}(q, d) = \sum_i w_i \times f_i(q, d) \qquad (1)$$

In this example, the score is related to a linear representation of the attributes of the search topic.

Two features/attributes, namely topical similarity and aggregate likelihood of being cited by similar articles, are developed from different perspectives. Preferably, topical similarity may be constructed based on text information of both the search query and each of the plurality of articles in the database, which is helpful in finding similar or topically-related articles.

Besides, aggregate likelihood of being cited by similar articles may be constructed from authors' perspective to capture the wisdom of crowds in citation choices. For example, this attribute may include crowd-based or crowd-sourced information associated with a list of references in each of the articles in the database. This feature helps to find not only related works, but also their citation choices.

Preferably, topical similarity may represent the topical relationships between two documents in a more explicit way than the content/text similarity, which may be considered as an important feature to identify the document relevance. In one example, the process includes inferring at least one relevant topic and a plurality of topic distribution associated with the search query and the plurality of articles in the database over the at least one relevant topic, which may be preferably based on Latent Dirichlet Allocation (LDA).

The basic idea of topic modelling algorithms such as Latent Dirichlet Allocation (LDA) is that documents may be generated by choosing a distribution over a set of latent topics and that each topic is in turn characterized by a distribution over words. Topic models may also assume that each document may contain multiple topics. For example, each document may be characterized by a distribution over a set of topics (i.e., topical distribution), which may be represented by a vector.

With the topical distributions of the search query over the relevant topics and the topical distribution of each of the articles in the database over the relevant topics, the topical similarity between the search query and each of the plurality of articles in the database is represented as a cosine similarity of the plurality of topic distribution. Preferably, the cosine similarity may be represented as follows:

$$\text{topical\_similarity}_{q,d} = \text{Cosine}(Q, D) = \frac{Q \cdot D}{|Q||D|} \qquad (2)$$

wherein Q denotes a multinomial distribution of the search query (i.e., an abstract) q over the relevant topics and D denotes a multinomial distribution of an article d in the database/corpus over the relevant topics.

As discussed above, the attribute of aggregate likelihood of being cited by similar articles captures the wisdom of crowds in the reference lists of academic articles. The method aggregates the citation decisions of all other articles regarding one candidate article, and may put more weights to the citation choices of topically similar papers. In the meantime, it may also capture the general consensus in citation choices (e.g., scientific article popularity). The underlying rationale is that prior citations choices by similar articles provide value for authors when deciding which papers to cite in their studies.

Figure 4:
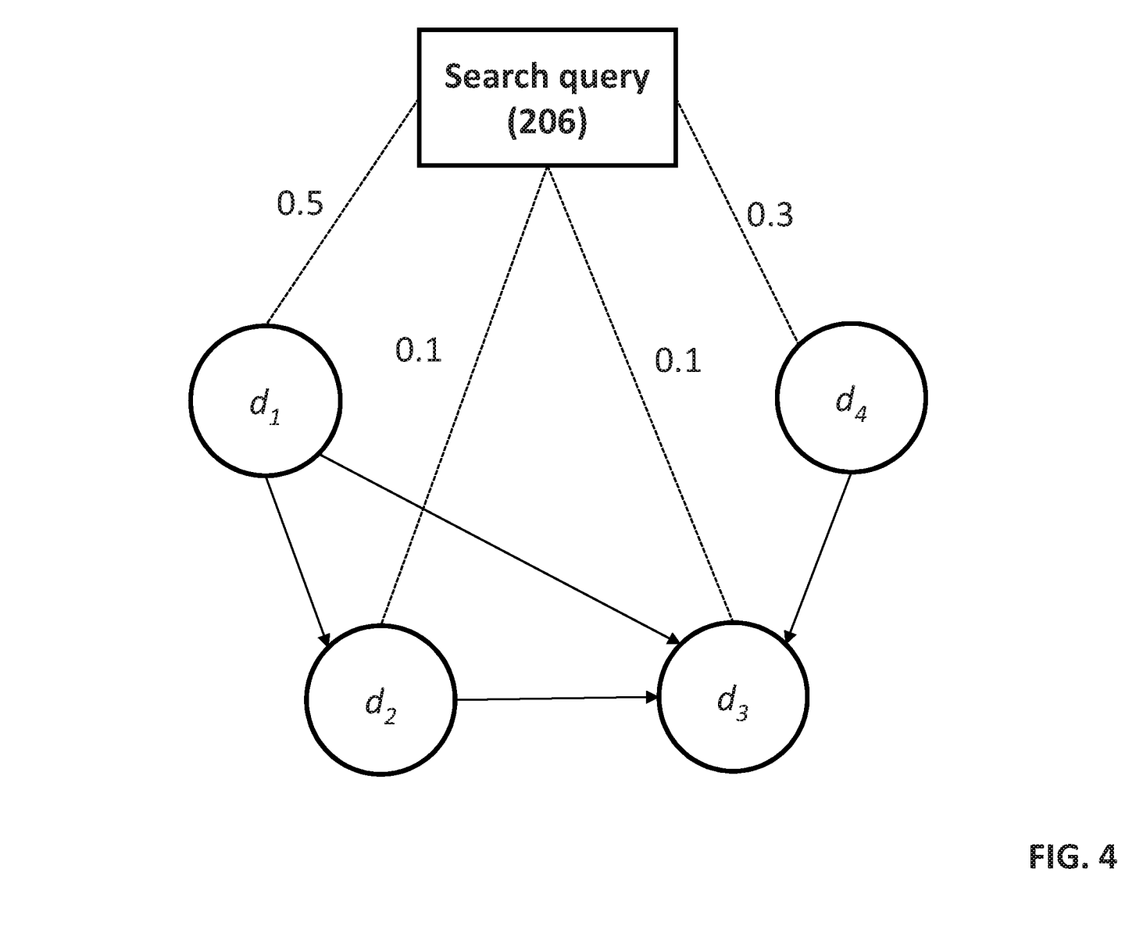
FIG. 4 is a diagram showing an example citation network representing a citation relationship between a search query and a plurality of articles in a database.

In this example, the aggregate likelihood is associated with the topical similarity between each of the plurality of articles and the other articles in the database. In addition, an article citation network which represents a citation relationship between the search query and the plurality of articles in the database may be used in the construction of the feature of aggregate likelihood. With reference to FIG. 4, there is shown an example citation network associated with a search query and four articles $d_1$ to $d_4$ in a literature database.

Preferably, the aggregate likelihood may be represented as:

$$\text{aggregate\_likelihood\_being\_cited}_{qd} = \sum_i^{n-1} \text{topical\_similarity}_{qi} \cdot c_{id} \quad (3)$$

wherein i denotes an article in the database except for the article d in the database, $c_{id}$ denotes a binary variable which represents a citation relationship of the article i to the article d, and $\text{topical\_similarity}_{qi}$ denotes the topical similarity between the search query and the article i. Alternatively or optionally, $c_{id}$ may be represented as a citation matrix containing a plurality binary variables each represent the citation relationship of the article i to the article d.

With the two features being determined and processed by the search input module and the database processing module, the database processing module may further determine a score for each of the plurality of articles in the database, and may obtain the list of results 208 representing the one or more of the plurality of articles in the database in an order according to the determined score.

For example, the score may be related to a linear representation of the at least one attribute of the search topic. In this linear representation, the ranking score or the linear representation may be calculated as a weighted sum as follows.

$$\text{score}(q,d) = w_1 \times \text{topical\_similarity}_{qd} + w_2 \times \text{aggregate\_likelihood\_being\_cited}_{qd} \quad (4)$$

where $w_1$ and $w_2$ are the feature weights. The two features may be put into log-space to better fit into the model, the improved performance achieved was illustrated in experimental results on the development set after log-transformation.

Alternatively, the weighted sum of the at least one attribute may be represented as:

$$\text{score}(q,d) = \sum_i w_i \times f_i(q,d) \quad (1)$$

wherein q denotes the search query, d denotes an article in the database, and $w_i$ denotes a feature weight assigned for each of the at least one attribute $f_i(q,d)$.

The feature weight may be determined based on a linear classifier. In one example, the top N articles for each search query (i.e., an abstract) may be collected based on the single feature of aggregate likelihood of being cited by similar articles in a descending order. The retrieved articles may be labelled with +1 if they appear in the reference lists of the query article, or −1 otherwise. Then, a linear classifier may be used to learn the weights for the two features on this training data.

Preferably, the linear classifier may include a logistic regression method or a Support Vector machine for optimizing Mean Average Precision (SVM-MAP) method. Logistic regression may measure the relationship between document relevance (i.e., a binary indicator) and the two features by estimating probabilities using a logistic function, and SVM-MAP is a learning technique which may train a support vector machine to directly optimize mean average precision. The inventors confirmed that consistent results may be obtained using any one of these two linear classifiers.

In one illustrative example, it is assumed that only four documents ($d_1$, $d_2$, $d_3$, $d_4$) are present in the corpus/database and a research abstract is entered as a query. The trained LDA model is first loaded to infer the topic distribution of the query text. Then the first feature of the topical similarity between the query text and every document in the corpus is determined based on equation (2).

Suppose that the topical similarity between the query text and $d_1$, $d_2$, $d_3$, and $d_4$ is 0.5, 0.1, 0.1, and 0.3, respectively:

$$\text{topical\_similarity}_q = [0.5\ 0.1\ 0.1\ 0.3] \quad (5),$$

where each element in the vector $a_i$ represents the topical similarity between the query text and $d_i$. The citation relationships can be represented by the citation matrix $$\text{citation\_matrix} = \begin{bmatrix} 0 & 1 & 1 & 0 \\ 0 & 0 & 1 & 0 \\ 0 & 0 & 0 & 0 \\ 0 & 0 & 1 & 0 \end{bmatrix}, \quad (6)$$

where each element in the matrix $b_{ij}$ (i.e., the value in row i and column j) denotes the existing citation relationship between $d_i$ and $d_j$.

In this example, if $d_i$ cites $d_j$, $b_{ij}=1$, otherwise, $b_{ij}=0$.

Referring to FIG. 4, there is shown an example citation network representing the citing relationship and the topical similarities between the search query and the articles $d_i$, where i=1, 2, 3 and 4. To calculate the second feature of the aggregate likelihood of being cited for each document in the corpus, a topical citation network is first constructed based on the topical similarity and citation matrix as shown in equations (5) and (6). In the network, the solid lines with arrows represent the existing citation relationships among the documents in the corpus. Specifically, each directed line denotes a document citing another document. For example, $d_1$ cites both $d_2$ and $d_3$. The dotted lines represent the topical similarity between the query text and documents in the corpus.

The aggregate likelihood of being cited feature for each document is constructed as the summation of whether every other document cites this document weighted by the topical similarity between the query text and every other document. For instance, this feature for $d_3$ is 0.5×1+0.1×1+0.3×1=0.9. Similarly, the feature for $d_2$, $d_4$ is 0, 0.5, and 0, respectively. The calculation of the aggregate likelihood of being cited may also be represented by a matrix multiplication as follows:

$$\text{aggregate\_likelihood\_being\_cited}_q = \quad (7)$$
$$\text{topical\_similarity}_q + \text{citation\_matrix} = [0\ 0.5\ 0.9\ 0]$$

where each element $c_i$ represents the feature of the aggregate likelihood being cited for $d_i$.

Let the weights of topical similarity and aggregate likelihood of being cited equal to 0.5 in the linear model as shown in equation (4). Thus, the ranking score between the query text and $d_i$ equals to $0.5 \times a_i + 0.5 \times c_i$. For example, the ranking score for $d_1$ is $0.5 \times 0.5 + 0.5 \times 0 = 0.25$.

The ranking scores of each of the articles relevant to the search query may be represented as follows:

$$\text{ranking\_scores}_q = \quad (8)$$
$$0.5 \times \text{topical\_similarity}_q + 0.5 \times \text{aggregate\_likelihood\_being\_cited}_q =$$
$$[0.25 \ 0.3 \ 0.5 \ 0.15]$$

where each element in the vector represents the ranking score of $d_i$ given the query text.

According to the ranking scores, the four documents will be recommended in the order of $d_3$, $d_2$, $d_1$, $d_4$.

Figure 3:
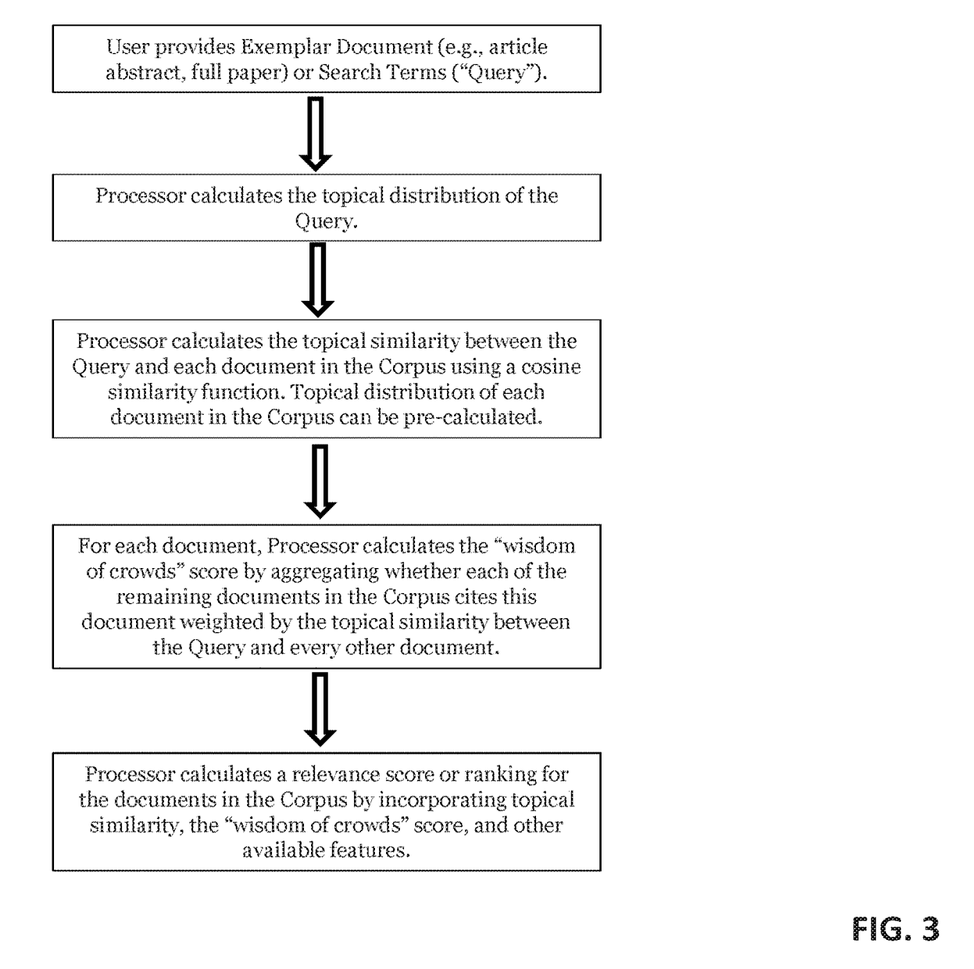
FIG. 3 is a flow diagram showing an example process of the method of conducting a textual data search in accordance with one embodiment of the present invention.

With reference to FIG. 3, there is shown a flow chart summarizing the entire process of the method for conducting a search as described above.

These embodiments may be advantageous in that the search method may be used in analyzing search queries in a form of a brief description such as a research abstract instead of the form of keywords in traditional search engines. Therefore, the results will be less likely to omit any results due to typographic errors or imprecise keyword matching.

Advantageously, the method does not require users to formulate their search queries based on keywords, and therefore it is not necessary for the users to try multiple queries using different keywords. In contrast, search queries consisting of a brief project description such as an abstract may be used as the query input accordance to the embodiments of the present invention.

The abstract-based query not only contains richer information but also relieves users from the burden of identifying the most appropriate keywords. The query does not necessarily need to be a well-written abstract. A combination of keywords would be sufficient as the query input, as the method is based on the bag-of-words assumption and which may also ignore the sequence of words in a sentence.

Advantageously, the recommended set of citations is scored and ranked by topical similarity and aggregate likelihood of being cited by articles similar to the abstract-based query. The searching process can only involve two attributes/features and does not require other attributes such as authors, co-authors, article venues, and citing snippets, etc. It may be difficult and time-consuming to collect all these kinds of information in practice.

In addition, the method may also be used in applications for automatically locating and recommending citations based on the text contents (such as one or more paragraphs in an abstract field). For example, a word processor may be implemented to automatically locate and insert a list of references which may be relevant to an article.

The inventors have evaluated the performances of the embodiments according to the present invention. In the experiments, the citation recommendation method according to one example embodiment is implemented, and has been evaluated on a standard dataset (i.e., ACL Anthology Reference Corpus) compared with existing methods. It is observed that the present invention with only two features involved achieves a similar level of accuracy as existing methods which may involve more features as abovementioned.

To evaluate the performance of the citation recommendation method, the method is tested on a standard dataset, the ACL Anthology Reference Corpus (ACL-ARC), and is compared with other example methods. In this experiment, the dataset contains 10,921 articles and 38,767 references to articles inside the ACL-ARC from 1965 to 2007 in the field of Computational Linguistics. The baseline search methods incorporate many features such as topical similarity and author behavioral patterns. It is shown that the present method significantly outperforms both a text similarity baseline and other related models using similar features.

In the experiment, articles that do not satisfy the following conditions were excluded. The included articles have full text with a document length exceeding 5 words; and have at least five references remaining after discarding the references to articles outside the processed corpus. Besides, articles published from 2000 to 2003 were used as a training set, articles published in 2004 as development set, and articles published from 2005 to 2006 as test set.

The summary statistics of the training and test set is shown in Table 1. Note that the features of aggregate likelihood of being cited by similar articles for all training and evaluation are constructed using the citation information over previous years.

|  | Train | Dev | Test |
| --- | --- | --- | --- |
| Years | 2000-2003 | 2004 | 2005-2006 |
| Articles | 619 | 318 | 864 |
| References | 4,734 | 2,545 | 7,637 |
| Refs/Article | 7.6 | 8 | 8.8 |

The title and abstract of an article was used as the search query. Because abstracts are not annotated in the corpus, each article text was truncated to the first 200 words as the query input. The system returns a list of articles, which are candidates to be cited by the query article. Then, the recommended list is compared against the reference list of the query article using mean average precision as the quantitative measure.

Mean average precision (MAP) may be applied to evaluate a ranked list across different queries in information retrieval (IR) systems. This measure is sensitive to the rank of all relevant documents, and gives the highest score when all correct predictions precede all incorrect predictions. MAP is defined as the arithmetic mean of average precision over a set of queries as shown in equation (10). Average precision is calculated for each query as the average of precision at every cutoff where a new relevant document is retrieved as:

$$AveP = \frac{\sum_{k=1}^{m} Precision_k}{m}$$

(9), where k denotes a point where a new relevant document is retrieved; m is the total number of relevant documents for a query.

$$MAP = \frac{\sum_{q \in Q} AveP_q}{|Q|}, \quad (10)$$

where q is a query in a set of queries Q; and |Q| is the number of queries in the set.

The following Table shows the comparisons of mean average precision of the method in accordance with the embodiments of the present invention with the baseline method on the development set. N is the number of articles collected for each abstract to train the model. The MAP of the present invention increases over the baseline method by 15.44 when N=100, and by 11.3 when N=2000, using the logistic model as the linear classifier in learning. The mean average precisions of the present invention are consistent across the four groups, that is, groups with different values of N or using different classifiers. When using SVM-MAP as the linear classifier, the MAP of the present method is only 3 points smaller than that of the baseline method. Considering that the baseline method incorporates 19 various features, the comparable mean average precision of the present method using only 2 features is more advantageous.

| Dev | N = 100 | N = 2000 |
|---|---|---|
| Logistic (Wisdom of Crowds) | 23.3 | 22.0 |
| Logistic (Baseline) | 7.9 | 10.7 |
| SVM-MAP (Wisdom of Crowds) | 22.6 | 22.5 |
| SVM-MAP (Baseline) | 25.3 | 25.5 |

To evaluate the effect of each feature on authors' citation choices, the inventors have conducted a feature analysis by comparing the mean average precision of the models using only topical similarity or aggregate likelihood of being cited and the model using both features. As shown in Table 3 below, in which the feature weights are trained using logistic regression on the training data (N=2000). Both topical similarity and aggregate likelihood of being cited can produce a MAP of more than 13 on its own, which suggests that the two features are equally important in predicting authors' citation choices. Besides, the two features combined can produce an increase of nearly 9 points in MAP. It indicates that the two features provide complementary and equally valuable information for citation prediction.

| Logistic (Wisdom of Crowds) | Dev MAP |
|---|---|
| Topical similarity | 13.2 |
| Aggregate likelihood of being cited by similar articles | 13.6 |
| Both features | 22.0 |

These embodiments are advantageous in providing a lightweight citation recommendation method based on the wisdom of crowds in citation choices. The method involves only two features (i.e., topical similarity and aggregate likelihood of being cited by similar articles) may deliver a similar/better performance as existing methods using many features. The method is highly efficient and relies on readily available information including article abstracts and reference lists, and the method is suitable for large-scale implementation.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of conducting a textual data search, comprising the steps of:
    receiving an input of a single search query consisting of a plurality of words associated with a search topic;
    analyzing the search query to determine at least one attribute of the search topic;
    processing the at least one attribute and a plurality of articles in a database, wherein each of the plurality of articles includes textual data representing a text content; and
    identifying one or more results being relevant to the search topic in the plurality of articles in the database; and
    generating a list of articles in an order based on a relevance to the search topic, wherein the at least one attribute includes a topical similarity between the search query and each of the plurality of articles in the database, an aggregate likelihood in which each of the plurality of articles is to be cited by other articles with a similar topic in the database; and crowd-based information associated with a list of references in each of the articles in the database.

2. A system for use in conducting a textual data search, comprising:
    a search input module arranged to receive an input of a single search query consisting of a plurality of words associated with a search topic and to analyze the search query to determine at least one attribute of the search topic; and
    a database processing module arranged to (a) process the at least one attribute and a plurality of articles in a database, wherein each of the plurality of articles includes textual data representing a text content, (b) identify one or more results being relevant to the search topic in the plurality of articles in the database, and (c) generate a list of articles in an order based on a relevance to the search topic, wherein the at least one attribute includes a topical similarity between the search query and each of the plurality of articles in the database, an aggregate likelihood in which each of the plurality of articles is to be cited by other articles with a similar topic in the database; and crowd-based information associated with a list of references in each of the articles in the database.

3. A method of conducting a textual data search in accordance with claim 1, further comprising the step of constructing the topical similarity based on text information of both the search query and each of the plurality of articles in the database.

4. A method of conducting a textual data search in accordance with claim 1, wherein the step of processing the at least one attribute and the plurality of articles in the database further includes inferring at least one relevant topic and a plurality of topic distributions associated with the search query and the plurality of articles in the database over the at least one relevant topic.

5. A method of conducting a textual data search in accordance with claim 1, wherein the aggregate likelihood is associated with the topical similarity between each of the plurality of articles and the other articles in the database.

6. A method of conducting a textual data search in accordance with claim 1, further comprising the step of determining a score for each of the plurality of articles in the database, wherein the score is related to a linear representation of the at least one attribute of the search topic.

7. A system for use in conducting a textual data search in accordance with claim 2, wherein the search input module is further arranged to construct the topical similarity based on text information of both the search query and each of the plurality of articles in the database.

8. A system for use in conducting a textual data search in accordance with claim 2, wherein the aggregate likelihood is associated with the topical similarity between each of the plurality of articles and the other articles in the database.

9. A system for use in conducting a textual data search in accordance with claim 2, wherein the database processing module is further arranged to determine a score for each of the plurality of articles in the database, wherein the score is related to a linear representation of the at least one attribute of the search topic.

10. A method of conducting a textual data search in accordance with claim 4, wherein the processing of the at least one attribute and the plurality of articles in the database is based on Latent Dirichlet Allocation.

11. A method of conducting a textual data search in accordance with claim 4, wherein the topical similarity between the search query and each of the plurality of articles in the database is represented as a cosine similarity of the plurality of topic distribution.

12. A method of conducting a textual data search in accordance with claim 5, wherein the aggregate likelihood is represented as:

aggregate_likelihood_being_cited$_{qd}$= $\Sigma_i^{n-1}$topical_similarity$_{qi}$·$c_{id}$;

wherein i denotes an article in the database except for the article d in the database, $c_{id}$ denotes a binary variable which represents a citation relationship of the article i to the article d, and topical_similarity$_{qi}$ denotes the topical similarity between the search query and the article i.

13. A method of conducting a textual data search in accordance with claim 6, wherein the linear representation includes a weighted sum of the at least one attribute.

14. A method of conducting a textual data search in accordance with claim 6, further comprising the step of obtaining the one or more result representing the one or more of the plurality of articles in the database in an order according to the determined score.

15. A system for use in conducting a textual data search in accordance with claim 9, wherein the one or more result represents one or more of the plurality of articles in the database in an order according to the determined score.

16. A method of conducting a textual data search in accordance with claim 11, wherein the cosine similarity is represented as:

$$\text{topical\_similarity}_{qd} = \text{Cosine}(Q, D) = \frac{Q \cdot D}{|Q||D|};$$

wherein Q denotes a multinomial distribution of the search query q over the at least one relevant topic and D denotes a multinomial distribution of an article d in the database over the at least one relevant topic.

17. A method of conducting a textual data search in accordance with claim 12, further comprising the step of representing $c_{id}$ with a citation matrix containing the plurality binary variables each represent the citation relationship of the article i to the article d.

18. A method of conducting a textual data search in accordance with claim 13, wherein the weighted sum of the at least one attribute is represented as: score(q,d)=$\Sigma_i w_i \times f_i$(q,d); wherein q denotes the search query, d denotes an article in the database, and $w_i$ denotes a feature weight assigned for each of the at least one attribute $f_i$(q,d).

19. A method of conducting a textual data search in accordance with claim 18, wherein the feature weight is determined based on a linear classifier.

20. A method of conducting a textual data search in accordance with claim 19, wherein the linear classifier includes at least one of a logistic regression method and a Support Vector machine for optimizing Mean Average Precision method.

* * * * *